US012461149B2

(12) United States Patent
Kleeberger et al.

(10) Patent No.: US 12,461,149 B2
(45) Date of Patent: Nov. 4, 2025

(54) ERROR DIAGNOSIS CIRCUIT AND METHOD FOR OPERATING A DEVICE

(71) Applicant: Infineon Technologies AG, Neubiberg (DE)

(72) Inventors: Veit Kleeberger, Munich (DE); Rafael Zalman, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/937,585

(22) Filed: Oct. 3, 2022

(65) Prior Publication Data

US 2023/0116822 A1 Apr. 13, 2023

(30) Foreign Application Priority Data

Oct. 8, 2021 (DE) .......................... 102021126122.8

(51) Int. Cl.
*G01R 31/3185* (2006.01)
*G01R 31/317* (2006.01)

(52) U.S. Cl.
CPC ................ *G01R 31/318558* (2013.01); *G01R 31/31705* (2013.01)

(58) Field of Classification Search
CPC ..... G01R 31/318558; G01R 31/31706; B60W 50/14

USPC .......................................................... 714/730
See application file for complete search history.

(56) References Cited

U.S. PATENT DOCUMENTS

| 2006/0005091 | A1* | 1/2006 | Mitra | G01R 31/318566 |
| | | | | 714/726 |
| 2011/0060975 | A1* | 3/2011 | Pappalardo | G06F 11/1608 |
| | | | | 714/E11.002 |
| 2012/0179336 | A1* | 7/2012 | Oakley | E05F 15/70 |
| | | | | 701/49 |
| 2016/0179634 | A1* | 6/2016 | Alexander | G06F 1/3275 |
| | | | | 714/53 |
| 2022/0188632 | A1* | 6/2022 | Culurciello | G06F 18/211 |

FOREIGN PATENT DOCUMENTS

WO 2019152772 A1 8/2019

* cited by examiner

*Primary Examiner* — Albert Decady
*Assistant Examiner* — Grace V Braden
(74) *Attorney, Agent, or Firm* — Harrity & Harrity, LLP

(57) ABSTRACT

An error diagnosis circuit includes a signal input for connection to a communication interface, configured to receive a first instruction and a second instruction for a device. A circuit is configured to compare the first instruction and the second instruction and to output an error signal if the first instruction and the second instruction differ from one another.

20 Claims, 5 Drawing Sheets

ERROR DIAGNOSIS CIRCUIT AND METHOD FOR OPERATING A DEVICE

CROSS REFERENCE TO RELATED APPLICATION

This application claims priority to German Patent Application No. 102021126122.8 filed on Oct. 8, 2021, the content of which is incorporated by reference herein in its entirety.

TECHNICAL FIELD

Example implementations deal with error diagnosis circuits and methods for operating a device with detection of an erroneous instruction.

BACKGROUND

Functional safety has become a crucial aspect of the growing number of electronic systems in automobiles. It is advisable to include functional safety in the design of an electronic product from the beginning and to maintain it throughout the entire system. Reliable calculations are required in the automobile electronics. Reliable calculations are conventionally achieved either using redundancy on the hardware level or using complex algorithmic considerations on the software level. These two approaches each have their own disadvantages.

Redundancy on the hardware level uses up space, consumes additional energy and increases the thermal load, which is often not acceptable in the case of small SoCs (for example pressure/TPMS sensors) which must be operated with a battery. The reason for this is that the entire calculation, and therefore also its uncritical part, is carried out in a double-blind manner and is clocked. Conventional redundancy on the software level requires additional computing time and may be very complex. The software developer must have profound knowledge of error-tolerant architectures since he must achieve the same result with two different calculations, for example, which also must not be mutually susceptible to the same errors. In addition, some parts, such as the comparison step of the redundant calculation, can be difficult to implement, in principle, without in turn themselves being a source of unidentifiable errors.

SUMMARY

One example implementation of an error diagnosis circuit includes a signal input for connection to a communication interface, configured to receive a first instruction and a second instruction for a device. A circuit is configured to compare the first instruction and the second instruction and to output an error signal if the first instruction and the second instruction differ from one another. A comparison of the instructions themselves makes it possible to execute software, which itself generates the instruction, once, twice or multiple times without further protection measures, for example. Nevertheless, radiation-induced bit errors while calculating the instruction or while transmitting the instruction to the device, for example, can be detected in a reliable and highly efficient manner.

A method for operating a device that provides the same advantages includes receiving a first instruction addressed to an address from a data bus and receiving a second instruction addressed to the address from the data bus. Furthermore, the first instruction and the second instruction are compared and an error signal is output if the first instruction and the second instruction differ from one another.

BRIEF DESCRIPTION OF THE DRAWINGS

Some examples of apparatuses and/or methods are explained in more detail below, merely by way of example, with reference to the accompanying figures, in which.

DETAILED DESCRIPTION

Some examples are now described in more detail with reference to the accompanying figures. However, further possible examples are not restricted to the features of these implementations described in detail. They may have modifications of the features and equivalents and alternatives to the features. Furthermore, the terminology which is used herein to describe specific examples is not intended to be restrictive for further possible examples.

Throughout the description of the figures, identical or similar reference signs refer to identical or similar elements or features which each can be implemented identically or else in modified form, while they provide the same or a similar function. In the figures, furthermore, the thicknesses of lines, layers and/or regions may be exaggerated for elucidation purposes.

If two elements A and B are combined using an "or", this should be understood such that all possible combinations are disclosed, e.g. only A, only B, and A and B, unless expressly defined otherwise in the individual case. As alternative wording for the same combinations, it is possible to use "at least one from A and B" or "A and/or B". That applies equivalently to combinations of more than two elements.

If a singular form, e.g. "a, an" and "the", is used and the use of only a single element is defined neither explicitly nor implicitly as obligatory, further examples can also use a plurality of elements in order to implement the same function. If a function is described below as being implemented using a plurality of elements, further examples can implement the same function using a single element or a single processing entity. Furthermore, it goes without saying that the terms "comprises", "comprising", "has" and/or "having" in their usage describe the presence of the specified features, integers, steps, operations, processes, elements, components and/or a group thereof, but do not exclude the presence or the addition of one or more other features, integers, steps, operations, processes, elements, components and/or a group thereof.

Figure 1:
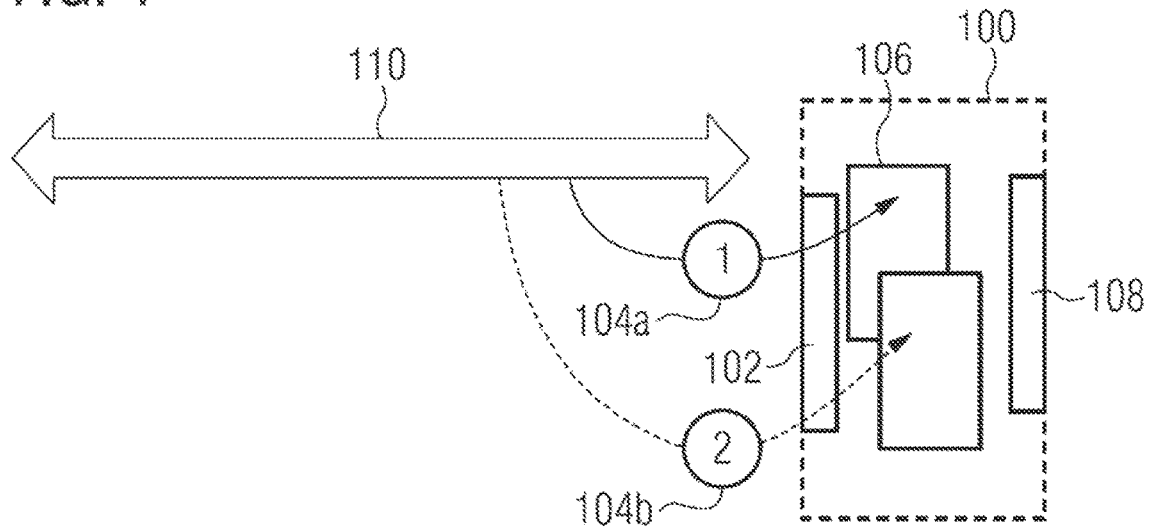
FIG. 1 shows an example implementation of an error diagnosis circuit.

FIG. 1 shows an example implementation of an error diagnosis circuit 100.

Figure 2:
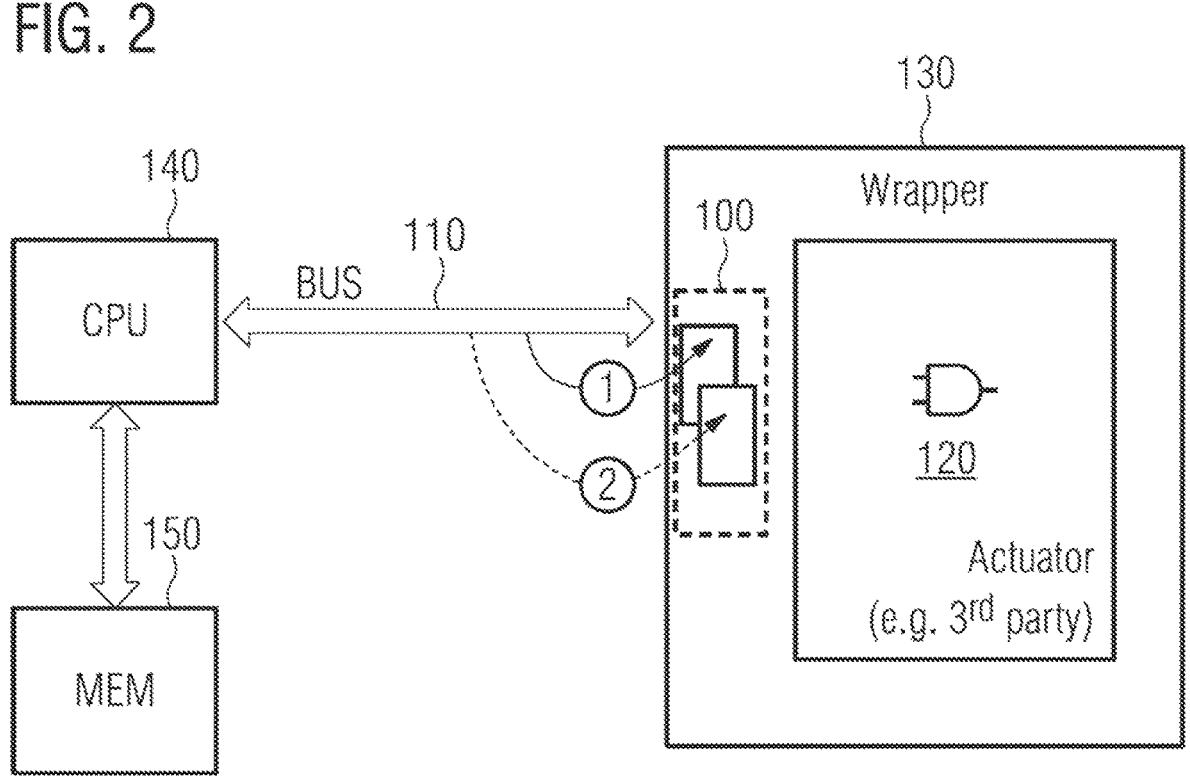
FIG. 2 shows an example implementation of a device arrangement having an error diagnosis circuit.
Figure 3:
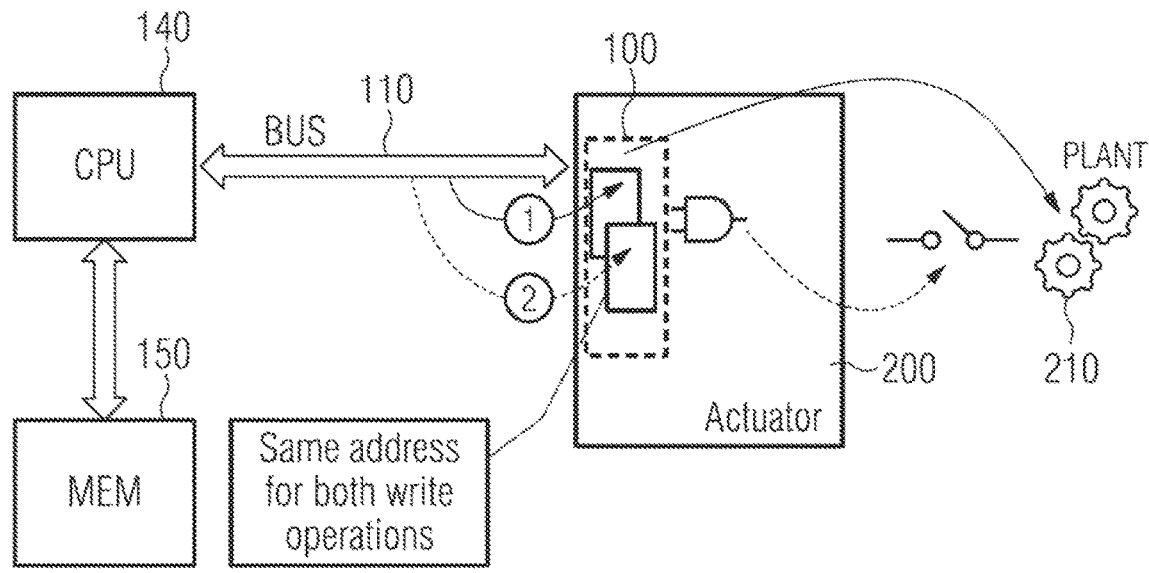
FIG. 3 shows an example implementation of a device arrangement having an error diagnosis circuit and a driven transmission.

The error diagnosis circuit 100 comprises a signal input 102 for connection to a communication interface 110. The error diagnosis circuit 100 can be universally operated using a wide variety of communication interfaces 110. The communication interface 110, via which the error diagnosis circuit 100 receives instructions, may therefore be, for example, a wired data bus, as illustrated in FIGS. 1-3. Alternatively, the communication interface 110 may also be, for example, any desired wireless interface, for example using WLAN or Bluetooth. Further communication interfaces may use light-based communication, whether via fiber-optic systems or using freely propagating optical communication in a vacuum or in air.

The signal input is configured to receive a first instruction 104a and a second instruction 104b for a device which is not illustrated in FIG. 1 and may be connected, for example, to an optional signal output 108 of the error diagnosis circuit 100.

A circuit 106 inside the error diagnosis circuit 100 compares the first instruction 104a and the second instruction 104b and outputs an error signal if the first instruction 104a and the second instruction 104b differ from one another. The error diagnosis circuit shown in FIG. 1 can therefore be used to monitor whether instructions which are addressed to a specific device have been created and transmitted without errors if they can be redundantly received. In some implementations, this check can be carried out directly in the device to be controlled, with the result that both the generation of the instruction using software, for example, and the entire communication path to the device to be controlled can be monitored in order to determine whether, for example, a radiation-induced bit error which would change one of the two instructions occurs. In this case, it is reliably identified that the instruction must be considered to be corrupted. The error signal output in this case may trigger further measures which should be specified in an application-specific manner. The type of error signal and its content initially do not play any role as long as it is clear that the error signal indicates an unreliable instruction.

This type of error diagnosis in turn makes it possible, on the software side, that is to say when creating the instructions, to easily ensure functional safety by processing the algorithm that generates the instruction twice in succession. Expensive redundant hardware or redundant, possibly even different, software algorithms for achieving the same aim can thereby be avoided. This makes the development process for controlling devices considerably more efficient both in terms of the time and in terms of the development and operating costs.

The error diagnosis circuit 100 is also independent of the manner in which the instructions for the devices are generated and coded. In some implementations, the error diagnosis circuit 100 does not need to know how the instructions are coded, whether they are transmitted in encrypted form or in plain text or how the communication protocol is set up.

Figure 4:
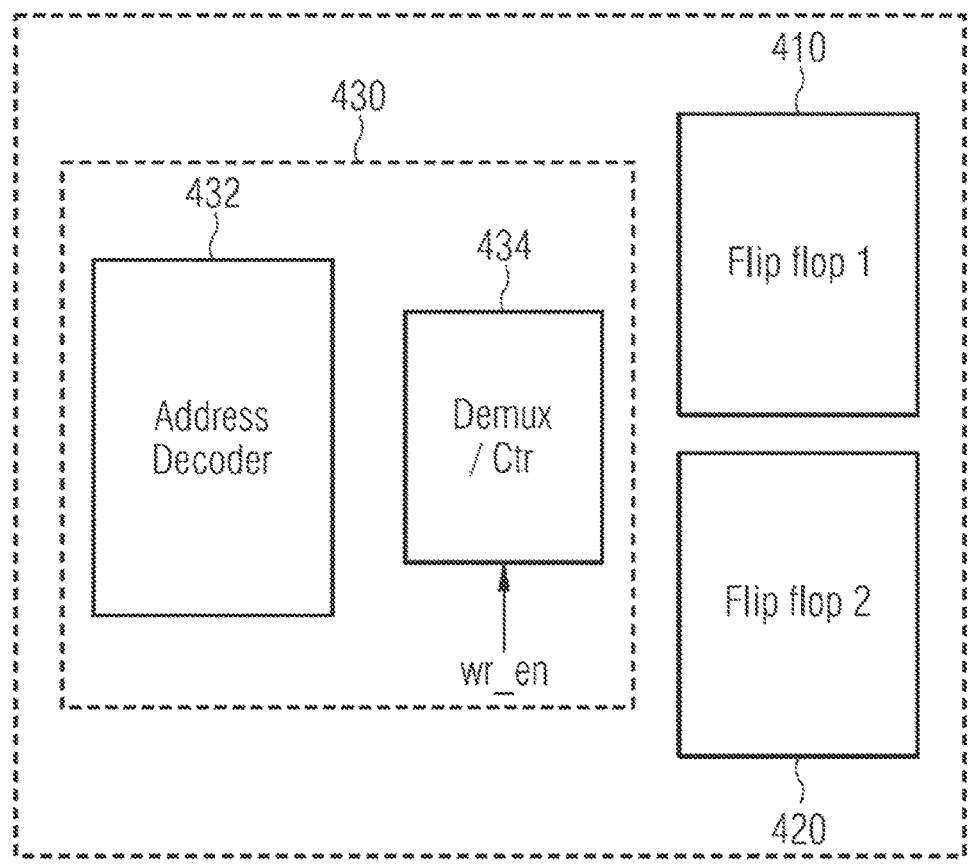
FIG. 4 shows an example of a decoder circuit in an error diagnosis circuit.

A relevant factor is that the error diagnosis circuit 100 recognizes that instructions are transmitted to the same device. For this purpose, according to some example implementations, for example in the case of bus communication, the address of the device to which the instructions are transmitted via the data bus is used. That is to say, the error diagnosis circuit 100 identifies the instructions transmitted to a device using the address to which messages containing an instruction are transmitted via the data bus. In these cases, the signal input 102 is configured to receive the first instruction 104a and the second instruction 104b from a data bus 110 if an address, to which the first instruction 104a and the second instruction 104b are transmitted, is identical. An example of a suitable address decoder is shown in FIG. 4, for example.

According to some example implementations, the error diagnosis circuit 100 is used only to detect an error which is communicated using the error signal at the signal output 108. According to some further example implementations, the error diagnosis circuit 100 can also be used to forward the instructions. For this purpose, the first instruction 104a can be output at the signal output 108 from which the device receives the instruction, for example. The signal output 108 is therefore configured in that case to output the first instruction 104a for the device.

According to some example implementations, the first instruction 104a can always be output immediately, for example, that is to say as soon as the first instruction 104a has been received at the signal input 102. The information relating to whether or not the instruction is reliable may be obtained in this case, after the first instruction 104a has been forwarded, by comparing it with the subsequently received second instruction 104b. This may be very advantageous in configurations in which a short latency is required when executing the instruction, for example if the one-off erroneous execution of an instruction does not signify a significant disadvantage. An example of this is the control of an electric motor which itself has a large moment of inertia or drives devices with a large moment of inertia. In this case, on account of the large mechanical moment of inertia, one-off erroneous control of the electric motor will not be able to change the system to a critical state since the inertia of the moving masses themselves ensures that the system is stabilized. Nevertheless, it should be determined whether one or possibly more successive instructions were erroneous in order to be able to infer a risk to safe operation and, if necessary, to initiate the required countermeasures such as switching off the electric motor or changing the electric motor to a safe operating state.

In other applications, only uncorrupted instructions may be output to the device. In this case, the first instruction can be output to the device only when the first instruction 104a and the second instruction 104b are compared and correspond to one another.

As already described, an example implementation of the error diagnosis circuit 100 can be connected to a data bus 110 in parallel with the device to be controlled or it can be connected as an interface between the data bus 110 and the device to be controlled. FIG. 2 shows such an example implementation. The error diagnosis circuit 100 is combined with the device 120 to be controlled, which is an actuator in the present case, in a functional unit or device arrangement 130. Only for the sake of completeness, a CPU 140 with a memory 150 is also illustrated in FIG. 2, wherein the first and second instructions for the device 120 are calculated in the CPU and are transmitted, via the data bus 110, to the signal input 102 of the error diagnosis device 100. This is part of the device arrangement 130, with the result that the error diagnosis device 100 can forward the first instruction 104a to the device 120 according to one of the implementation possibilities described above. The device arrangement 130 shown in FIG. 2 has the advantage that any desired actuators can be expanded using the additional cost-effective hardware of the error diagnosis circuit 100, with the result that they can thereby be used in systems which presuppose high functional safety. However, the error diagnosis circuit 100 can also be combined with the device 120 in any other desired manner. For example, the device 120 and the error diagnosis circuit 100 can be fitted in an additional common housing, or the error diagnosis circuit 100 may be arranged in the form of an intermediate plug between the data bus 110 and the device 120. If geometrically possible, the error diagnosis circuit 100 may be arranged inside the housing of an existing device 120.

In all configurations, it is advantageous if the device 120 or the actuator is equipped with a signal input for receiving instructions for the actuator 120, which signal input is coupled to a signal output 108 of the error diagnosis circuit 100.

FIG. 3 shows the example of the device arrangement from FIG. 2 using the example of a transmission 210 which is illustrated in a stylized manner and is controlled using the actuator 200. Since the features relating to the error diagnosis circuit 100 and the interaction with the actuator 200 otherwise do not differ from those which have already been described in connection with FIG. 2, a further detailed description of FIG. 3 is dispensed with.

FIG. 4 shows an example of a decoder circuit 430 inside an error diagnosis circuit. The decoder circuit 430 contains an address decoder 432 which extracts the address, to which a message was sent on the data bus, from the data stream. It also contains a demultiplexer 434 which, when the address of the device first occurs, transmits the associated instruction to the first flip-flop 410 and, when the address of the device subsequently occurs for the second time, transmits the associated instruction to the second flip-flop 420. The first flip-flop 410 and the second flip-flop 420 therefore act as the first memory 410 for the first instruction 104*a* and as the second memory 420 for the second instruction 104*b*. The two instructions can then be easily compared in hardware, and FIG. 4 proves that the hardware required for this functionality is minimal. Therefore, in other words, the decoder circuit 430 is configured, when an instruction for an address of the device 120 is first received, to transmit the instruction to the first memory 410 and, when an instruction for the address of the device 120 is subsequently received for the second time, to transmit the instruction to the second memory 420.

For the sake of completeness, FIGS. 5 and 6 again schematically show flowcharts which describe the use of the error diagnosis circuit 100 to operate a device.

Figure 5:
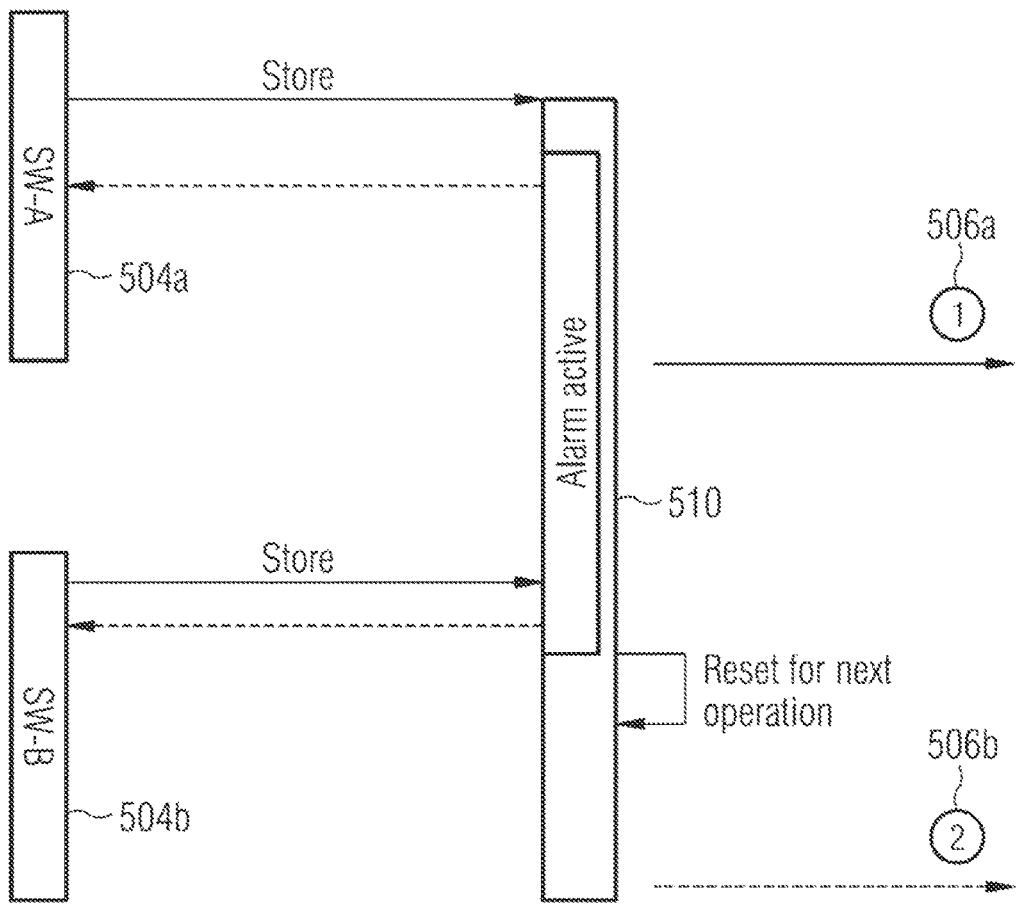
FIG. 5 shows an example implementation of a method for operating a device.

FIG. 5 shows an example implementation of a method for operating a device, wherein both the steps for generating the instructions on the software side and the steps for checking the instructions are illustrated.

The first instruction 504*a* is first of all generated by the hardware controlling a device or by software running on the hardware. This instruction is transmitted to the error diagnosis circuit 510 and is stored there for subsequent comparison with a further instruction. Depending on the configuration of the error diagnosis circuit 510, a copy of the first instruction 506*a* may also be forwarded immediately after receiving the first instruction 504*a*. The second instruction 504*b* is likewise generated by the hardware controlling the device and is transmitted to the error diagnosis circuit 510 which compares it with the first instruction 504*a* and generates an error signal in the event of a discrepancy. Depending on the configuration, a copy of the second instruction 506*b* can also be output only now in the event of a successful comparison. The described method can be carried out anywhere in the data flow path between the controller and the device, for example also directly on the controller or directly on the device.

Figure 6:
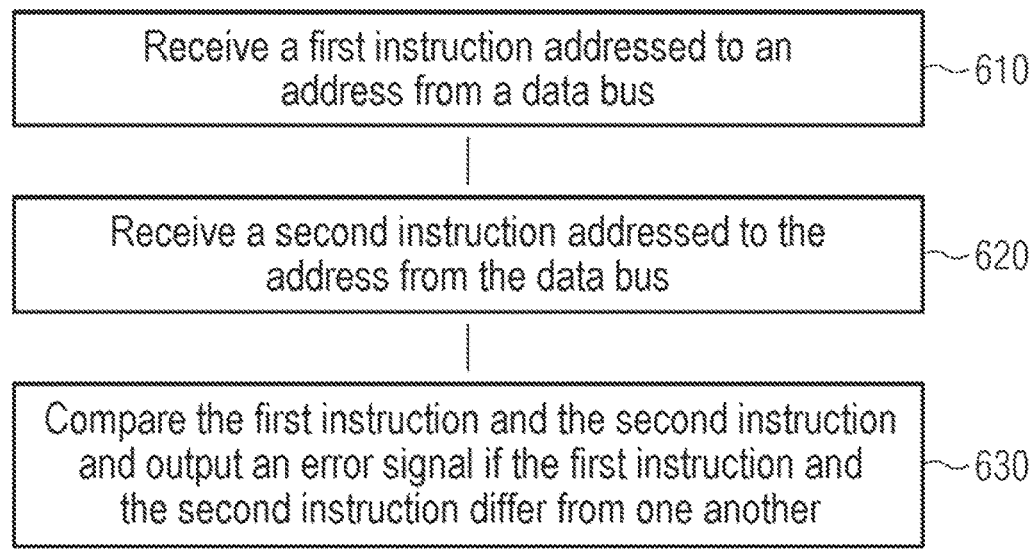
FIG. 6 shows a flowchart of an example implementation of a method for operating a device.

FIG. 6 shows a flowchart of an example implementation of a method for operating a device, which concentrates on the necessary steps for operating the device, that is to say in which the generation of the instructions is not illustrated, unlike in FIG. 5.

As already described with reference to FIG. 5, the method for operating the device comprises receiving 610 a first instruction addressed to an address from a data bus and receiving 620 a second instruction addressed to the address from the data bus. The method also comprises comparing 630 the first instruction and the second instruction and outputting an error signal if the first instruction and the second instruction differ from one another.

The method optionally also comprises outputting the first instruction to the device if the first instruction and the second instruction correspond to one another.

Figure 7:
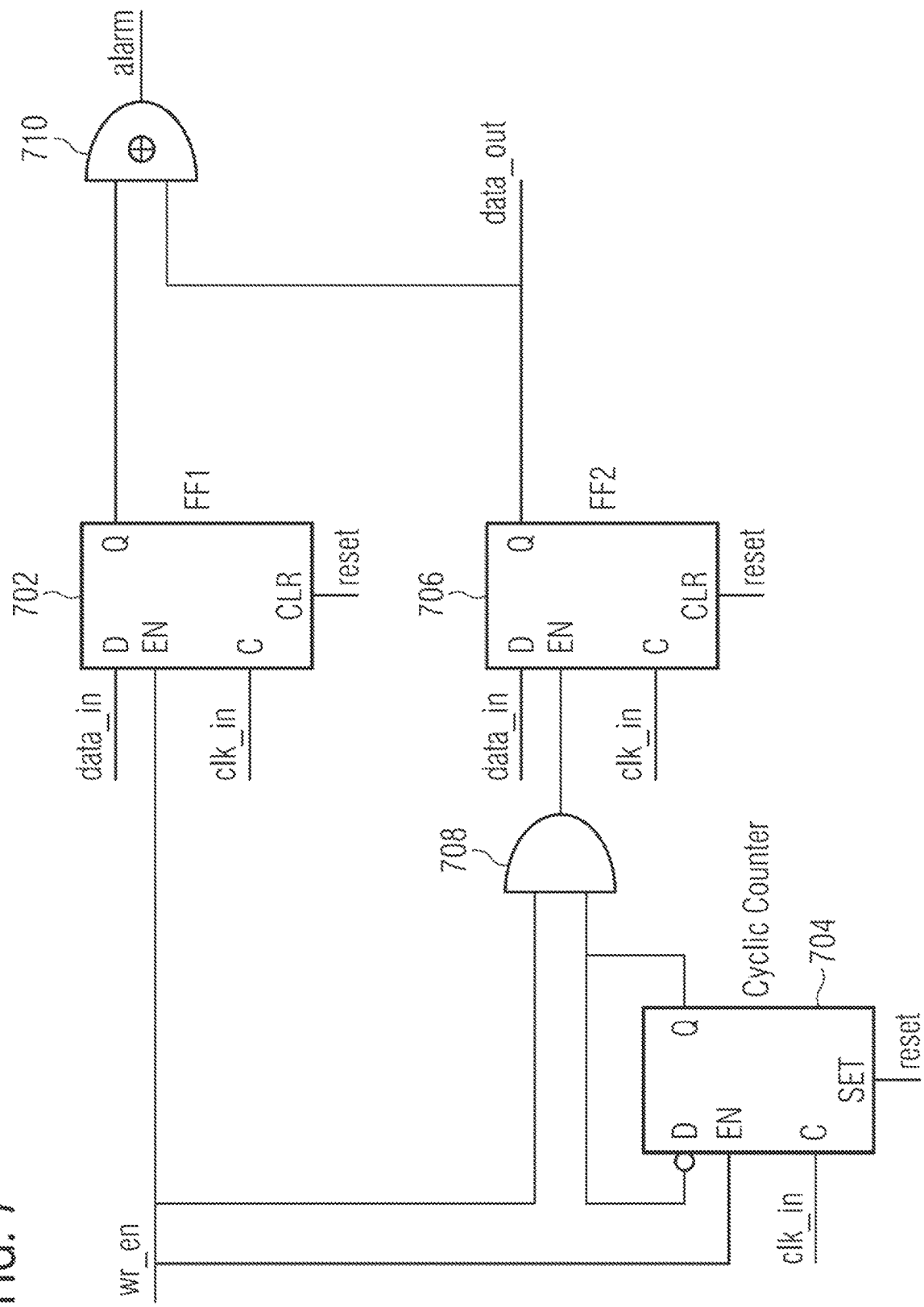
FIG. 7 shows an example implementation of a circuit with immediate forwarding of the instruction.

FIG. 7 shows an example implementation of a circuit with immediate forwarding of the instruction. This circuit may be used inside a fault diagnosis circuit, for example.

This is the "actuate-first" variant, that is to say the first instruction is directly forwarded to signal output 720 (data_out) during the first writing operation. The signal output 720 is therefore configured to output the first instruction for the device as soon as the first instruction for the device has been received at the signal input not shown here. A logic 1 is present at the output of the cyclic counter 704 at the beginning of signal processing or after a reset.

During the first operation of writing the instruction to a data bus, that is to say when receiving the first instruction at the data_in inputs of the first flip-flop 702 (FF1) and of the second flip-flop 706 (FF2), the first instruction is written to the two flip-flops 702 and 706 since the signal wr_en (write enable), which causes an operation of writing to the flip-flops, corresponds to a logic 1 at activation inputs EN of the two flip-flops 702 and 706. The signal wr_en is directly present at the activation input EN of the first flip-flop 702. The activation input EN of the second flip-flop 706 also sees a logic 1 from an output of an AND gate 708 which links the output signal from the cyclic counter 704 to the signal wr_en.

The data output 720 of the circuit corresponds to the data output of the second flip-flop 706. As a result, the first instruction is present at the data output 720 after the first writing operation.

In the next cycle, the cyclic counter 704 is updated with the value 0 as a result of its feedback. During the second writing operation, a logic 0 is therefore present at the output of the cyclic counter 704. The second flip-flop 706 does not see a logic 1 at its activation input EN since the cyclic counter 704 is now at 0 and the AND gate 708 therefore generates a 0 at its output. Only the first flip-flop 702 is therefore written to in this cycle.

A logic 1 is therefore consequently present as an error signal at the output of the XOR gate 710 at the end of this cycle if the second write access is not equal to the first write access and if the first instruction does not correspond to the second instruction, since the flip-flops 702 and 706 then contain different instructions.

Figure 8:
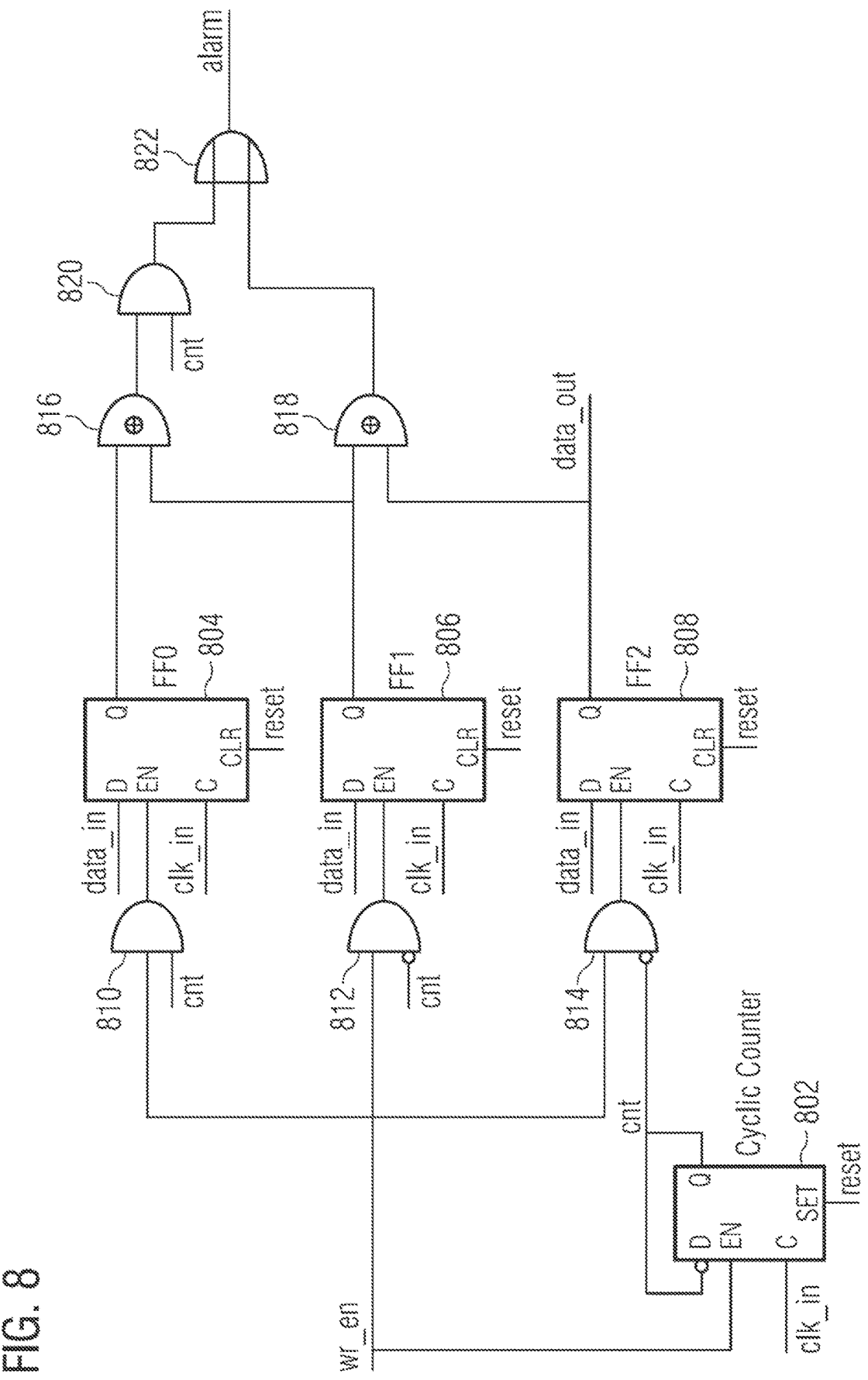
FIG. 8 shows an example implementation of a circuit with forwarding of the instruction if no error has been diagnosed.

FIG. 8 shows an example implementation of a circuit with delayed forwarding of the instruction if an error has not been diagnosed. This circuit may be used, for example, inside an error diagnosis circuit.

FIG. 8 therefore illustrates the "actuate-last" variant, that is to say the first or the second instruction is forwarded to the signal output 830 only during the second operation of writing the instruction if the first and second instructions correspond. The signal output 830 is therefore configured to output the first instruction or the second instruction for the device only when the first instruction and the second instruction correspond to one another.

A logic 1 is present at the output of the cyclic counter 802 at the beginning of signal processing or after a reset.

As a result, upon receiving the first instruction, only the first flip-flop 804 (FF0) is written to, the activation input EN of which is connected to the output of a first AND gate 810 which, in addition to the signal wr_en, receives a non-inverted output signal from the cyclic counter 802 as an input.

In contrast, the AND gates 812 and 814, which are connected to the activation inputs of a second flip-flop 806 and of a third flip-flop 808, receive, in addition to the signal wr_en, an inverted output signal from the cyclic counter 802 as an input. Consequently, the flip-flops 806 and 808 are not written to during the first operation of writing the first instruction or when receiving the first instruction.

After the first instruction has been received, the output of the cyclic counter 802 becomes 0. The signal output generally retains the error signal from the preceding cycle (likewise consisting of the reception of a first instruction and a second instruction) after receiving the first instruction for the following reasons. The second flip-flop 806 and the third flip-flop 808 continue to retain the second instruction from the previous writing cycle. There is probably a 1 at the output of the first XOR gate 816 (since the content of the first flip-flop 804 of the current writing cycle normally differs from the content of the second flip-flop 806 from the previous writing cycle). However, this is gated to a 0 by the AND gate 820 having a signal input which is connected to the output signal from the cyclic counter 802 (which is in turn 0). In the event of an error-free previous cycle, a 0 is present at the output of a second XOR gate 818 which is connected to the second flip-flop 806 and to the third flip-flop 808. The error signal at the output of the AND gate 822 is therefore 0.

Since, after the first instruction has been received, the output of the cyclic counter 802 is 0, the second instruction is written to the second flip-flop 806 and to the third flip-flop 808 upon receiving the second instruction. Since the data output 830 corresponds to the output of the third flip-flop 808, the second instruction is provided at the data output 830 only after it has been received, at the same time as an error signal which indicates its reliability. The error signal is generated as follows.

After the second instruction has been written for the second time or received, the output of the cyclic counter 802 is 1 again. In a positive case, the output of the XOR gate 816 is 0 since the data_in the first flip-flop 804 then correspond to those in the second flip-flop 806. The generation of an error signal is active since a 1 is present at the AND gate 820 from the cyclic counter and the other input signal from the XOR gate 816 is therefore not gated.

In a positive case, the output of the XOR gate 816 is consequently likewise 0, with the result that, if the received first instruction corresponds to the received second instruction, a 0 is generated as an error signal at the output of the AND gate 822. Following the same logic, a 1 is output there as an error signal if this is not the case.

The example implementations eliminate the problems of conventional redundant SW execution by eliminating the SW comparator and replacing it with a HW-based actuator level comparison. Furthermore, unlike in conventional solutions, there is the possibility of actuation after the first calculation and triggering an alarm if results differ.

The described example implementations also make it possible to rationalize the SW development. There is no need for additional SW development (for example for a dedicated reliable comparator between the redundant execution flows)—the main program is simply executed twice (with the same triggering scheme). The same alarm routine (as in a SW comparator) can be reused. Furthermore, the example implementations improve the response time. The entire program and data flow for the control is protected by this mechanism (that is to say until the last HW control). The implementation is scalable (no high HW overhead as in the case of complete HW redundancy)—the safety mechanism can be used only for safety-relevant SW. The example implementations make it possible to considerably reduce the HW random error targets for the main computer unit since they provide a robust and effective safety mechanism at the end of the actuation chain and therefore also additional protection for non-computing elements from the computer unit to actuation.

The aspects and features described in connection with a specific one of the previous examples can also be combined with one or more of the further examples in order to replace an identical or similar feature of this further example or to additionally introduce the feature into the further example.

Examples can also be or relate to a program comprising a program code for carrying out one or more of the above methods when the program is executed on a computer, a processor or some other programmable hardware component. Steps, operations or processes of various methods from among those described above can thus also be performed by programmed computers, processors or other programmable hardware components. Examples can also cover program storage apparatuses, e.g. digital data storage media, which are machine-readable, processor-readable or computer-readable and code or contain machine-executable, processor-executable or computer-executable programs and instructions. The program storage apparatuses can comprise or be e.g. digital memories, magnetic storage media such as, for example, magnetic disks and magnetic tapes, hard disk drives or optically readable digital data storage media. Further examples can also cover computers, processors, control units, programmable logic arrays (PLAs), programmable gate arrays (PGAs), graphics processors, application-specific integrated circuits, integrated circuits or systems-on-a-chip which are programmed to carry out the steps of the methods described above.

It furthermore goes without saying that the disclosure of a plurality of steps, processes, operations or functions disclosed in the description or the claims should not be interpreted as being mandatorily in the order described, unless this is explicitly indicated or absolutely necessary for technical reasons in an individual case. Therefore, the preceding description does not limit the implementation of a plurality of steps or functions to a specific order. Furthermore, in further examples, an individual step, an individual function, an individual process or an individual operation can include a plurality of substeps, subfunctions, subprocesses or sub-operations and/or be subdivided into them.

Where some aspects in the preceding sections have been described in association with an apparatus or a system, these aspects should also be understood as a description of the corresponding method. In this case, for example, a block, an apparatus or a functional aspect of the apparatus or of the system can correspond to a feature, for instance a method step, of the corresponding method. Analogously thereto, aspects described in association with a method should also be understood as a description of a corresponding block, a corresponding element, a property or a functional feature of a corresponding apparatus or a corresponding system.

The claims that follow are hereby incorporated in the detailed description, where each claim can be representative of a separate example by itself. Furthermore, it should be taken into consideration that—although a dependent claim refers in the claims to a specific combination with one or more other claims—other examples can also encompass a combination of the dependent claim with the subject matter of any other dependent or independent claim. Such combinations are hereby explicitly proposed, provided that in an individual case no indication is given that a specific combination is not intended. Furthermore, features of a claim are also intended to be included for any other independent claim, even if this claim is not directly defined as being dependent on this other independent claim.

What is claimed is:

1. An error diagnosis circuit, comprising:
   a signal input component, for connection to a communication interface, configured to receive a first instruction, comprising a first address associated with a device, and a second instruction, comprising the first address associated with the device; and
   a circuit, within the error diagnosis circuit, comprising:
      a first flip-flop component configured to store the first instruction,
      a second flip-flop component configured to store the second instruction, and
      an exclusive OR gate configured to:
         compare the first instruction and the second instruction, and
         output an error signal when the first instruction is different from the second instruction,
      wherein the error diagnosis circuit is used only to detect an error associated with the error signal.

2. The error diagnosis circuit of claim 1, further comprising a signal output configured to output the first instruction before receiving the second instruction and before outputting the error signal.

3. The error diagnosis circuit of claim 1, wherein the signal input component is configured to receive the first instruction and the second instruction from a data bus.

4. The error diagnosis circuit of claim 1, further comprising:
   a decoder circuit configured to;
      transmit the first instruction to the first flip-flop component, and
      transmit, based on the decoder circuit receiving the second instruction after the first instruction, the second instruction to the second flip-flop component.

5. The error diagnosis circuit of claim 1, wherein the device is an actuator.

6. A method, comprising:
   receiving, by a first flip-flop component of an error diagnostic circuit and from a data bus, a first instruction, comprising a first address;
   receiving, by a second flip-flop component of the error diagnostic circuit and from the data bus, a second instruction comprising the first address;
   transmitting, by the first flip-flop component to an exclusive OR gate of the error diagnostic circuit, the first instruction;
   transmitting, by the second flip-flop component to the exclusive OR gate, the second instruction;
   comparing, by the exclusive OR gate, the first instruction and the second instruction; and
   outputting, by the exclusive OR gate, an error signal, when the first instruction is different from the second instruction, or the first instruction or second instruction, when the first instruction is identical to the second instruction,
   wherein the error diagnosis circuit is used only to detect an error associated with the error signal.

7. The method of claim 6, further comprising:
   outputting the first instruction before receiving the second instruction and before outputting the error signal.

8. The method of claim 6, wherein the first address is associated with a device.

9. The error diagnosis circuit of claim 1, wherein the second flip-flop component further receives the first instruction and outputs the first instruction before receiving the second instruction.

10. The error diagnosis circuit of claim 1, wherein at least one of:
    the first flip-flop component receives the first instruction from a first AND gate, or
    the second flip-flop component receives the second instruction from a second AND gate.

11. The error diagnosis circuit of claim 10, wherein the first flip-flop component receives the first instruction from the first AND gate, and the second flip-flop component receives the second instruction from the second AND gate.

12. The error diagnosis circuit of claim 10, wherein at least one of the first AND gate and the second AND gate receive feedback from a cyclic counter.

13. The method of claim 6, wherein the first instruction and the second instruction are received from a data bus.

14. The method of claim 6, wherein the first instruction and the second instruction are received from a decoder circuit.

15. The method of claim 8, wherein the device is an actuator.

16. The method of claim 6, wherein at least one of:
    the first flip-flop component receives the first instruction from a first AND gate associated with a cyclic counter, or
    the second flip-flop component receives the second instruction from a second AND gate associated with the cyclic counter.

17. The method of claim 16, wherein the first flip-flop component receives the first instruction from the first AND gate, and the second flip-flop component receives the second instruction from the second AND gate.

18. A circuit, comprising:
    a first flip-flop component configured to receive a first instruction comprising a first address associated with an actuator;
    a second flip-flop component configured to:
       receive the first instruction and a second instruction, wherein the second instruction comprises a second address associated with the actuator,
       output the first instruction; and
    an exclusive OR gate configured to:
       receive, from the first flip-flop component, the first instruction,
       receive, from the second flip-flop component, the second instruction,
       compare the first instruction and the second instruction, and
       output a signal based on whether the first instruction is identical to the second instruction.

19. The circuit of claim 18, wherein the second flip-flop component further receives the first instruction and outputs the first instruction before receiving the second instruction.

20. The circuit of claim 18, wherein at least one of:
the first flip-flop component receives the first instruction from a first AND gate, or
the second flip-flop component receives the second instruction from a second AND gate.

\* \* \* \* \*